United States Patent Office 3,399,214
Patented Aug. 27, 1968

3,399,214
OXIDES OF CARBOXAMIDO OXATHIINS
Marshall Kulka, Dalel Singh Thiara, and William A. Harrison, Guelph, Ontario, Canada, assignors to Uniroyal, Inc., a corporation of New Jersey
No Drawing. Filed Nov. 5, 1965, Ser. No. 506,596
10 Claims. (Cl. 260—327)

ABSTRACT OF THE DISCLOSURE 2,3-dihydro-5-carboxamido - 6 - methyl - 1,4, - oxathiin sulfoxides and sulfones of the formula:

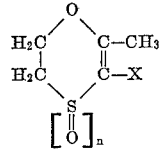

wherein X is a carboxamido group and $n$ equals 1 or 2, are prepared by oxidation (e.g., with hydrogen peroxide in acid medium) of the corresponding oxathiin. The nitrogen atom of the carboxamido group may be variously substituted, for example with phenyl, as in 2,3-dihydro-5-carboxanilido-6-methyl-1,4-oxathiin sulfoxide or sulfone. The chemicals are useful as fungicides and bactericides.

---

This invention relates to new chemicals, more particularly 2,3-dihydro - 5 - carboxamido-6-methyl-1,4-oxathiin sulfoxides and sulfones (I).

The chemicals of the invention may be represented by the formula

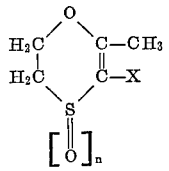

wherein X is a carboxamido group and $n$ equals 1 or 2. The nitrogen atom of the carboxamido group may be variously substituted, as will be exemplified in detail.

The chemicals of the invention are adapted to various uses. Thus, they are not only useful as intermediates for the synthesis of other chemicals, but they may themselves be put to practical use as fungicides, bactericides, and other uses.

The sulfoxides and sulfones of the invention may be prepared by oxidation of 2,3-dihydro-5-carboxamido-6-methyl-1,4-oxathiins, which are disclosed in our copending application Serial No. 451,048, filed April 26, 1965.

The sulfoxides (I, $n=1$) may be prepared by dissolving the 2,3-dihydro-5-carboxamido-6-methyl-1,4-oxathiins (I, $n=0$) in a suitable solvent such as acetic acid, acetone, etc., or mixtures thereof and treating the solution with one mole of 30% hydrogen peroxide (concentrations of 15 to 30% may be used) keeping the temperature at 0 to 25° C. preferably 10° C. The sulfoxides are recovered from the reaction mixture by removal of the solvent and crystallization of the residue. Examples of the sulfoxide preparation are given in Table I, below.

The sulfones (I, $n=2$) may be prepared by dissolving the 2,3-dihydro-5-carboxamido-6-methyl-1,4-oxathiins (I, $n=0$) in a suitable solvent such as acetic acid, acetone, etc., or mixtures thereof and treating the solution with 2 to 3 moles of 30% hydrogen peroxide at temperatures of 45 to 95° C. Preferably the sulfide (I, $n=0$) solution is treated with 30% hydrogen peroxide at a temperature of 45 to 70° C. first and when the exothermic reaction subsides the reaction mixture is heated at 70–90° C. The sulfones (I, $n=2$) are recovered by dilution of the reaction mixture with water and crystallization of the precipitate. When the more soluble I ($n=0$) are oxidized in concentrated solution the sulfone crystallizes from the reaction mixture without dilution. The sulfones (I, $n=2$) may also be prepared from the sulfoxides (I, $n=1$) by oxidation with hydrogen peroxide. Examples of sulfone preparation are given in Table II, below.

The oxathiins (I, $n=0$) themselves from which the sulfoxides (I, $n=1$) and sulfones (I, $n=2$) of the invention are prepared may in turn be made by various methods, as is disclosed in more detail in application Ser. No. 451,048 previously referred to.

One method, represented by the following equations, involves providing the appropriate known alphachloroacetoacetamide (III) (which may in turn be prepared in accordance with conventional practice, for example, by chlorination of the acetoacetamide (II) with sulfuryl chloride in benzene), and then reacting III with 2-mercaptoethanol (IV) under basic conditions. (It will be understood that alpha-bromoacetoacetamide may be used instead.) The reaction proceeds through two intermediates V and VI, neither of which need be isolated.

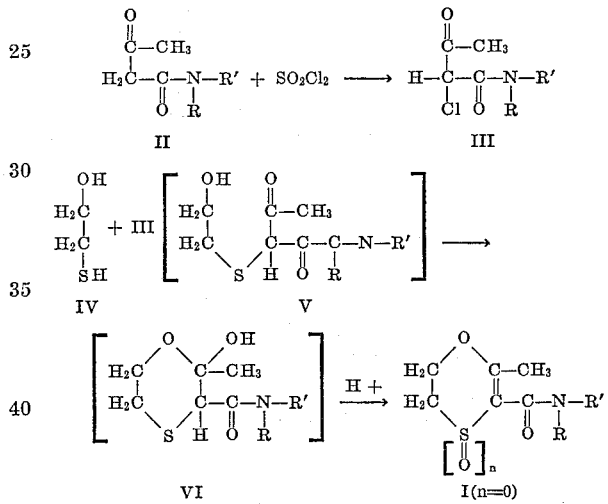

The reaction between III and IV, in the presence of a base, whether an inorganic base (e.g., alkali metal hydroxide, carbonate or bicarbonate) or an organic base (e.g. pyridine or N,N'-dimethylaniline, proceeds readily at ambient temperatures. The reaction is conveniently carried out in any solvent medium that is inert under the conditions of the reaction, such as water, alcohol (e.g., methanol, ethanol, butanol, propanol, etc.) or other organic solvent, for example a hydrocarbon solvent such as benzene or hexane, ether, acetone, pyridine, dioxane, etc. or a mixture of such solvents. Preferably a volatile solvent is used to facilitate recovery of the product. The reaction is exothermic, and in order to prevent an undue rise in temperature one of the reactants (conveniently in solution) may be added gradually to the other (preferably in solution). External cooling may be applied if necessary, but in any case it is not necessary to maintain any particular critical temperature range. The materials may be reacted in equimolar quantities or an excess of one of the reactants may be employed if desired. When the base employed is potassium hydroxide, potassium chloride is formed during the reaction; this precipitates (when water is not the solvent) and can be filtered off. The reaction mixture at this stage contains the intermediate V or VI or both. Although the intermediates can be recovered by evaporating the solvent, this is not necessary. The intermediate V cyclizes readily to VI under slightly acid condition. The intermediate VI is readily dehydrated to yield the product I. This is conveniently accomplished by acidification of the solution, for example with a small quantity of organic acid (e.g., para-toluenesulfonic acid, benzenesulfonic acid, p-chlorobenzenesulfonic acid, etc.) or inorganic acid (e.g., hydrochloric acid). The dehydration is facilitated by heating, and particularly by heating under reflux conditions to drive off the water formed, conveniently as an azeotrope with benzene or the like from which the water can be separated before returning the reflux. Many possible variations in the procedure will be apparent to those skilled in the art.

Alternatively the synthesis may be carried out in one pot. After the chlorination is complete, the hydrogen chloride and sulfur dioxide are blown out with air and then the resulting suspension of the alpha-chloroacetoacetamide (III) in benzene is directly treated with 2-mercaptoethanol as above.

A second method for the preparation of the presently employed starting compound I ($n=0$) involves ring formation first and then the amide function adjustment, as represented in the equations below. An alkyl acetoacetate such as ethyl acetoacetate (VII) (or equivalent, such as any lower alkyl [1–4C atoms] acetoacetate) is chlorinated with sulfuryl chloride to form the known ethyl alpha-chloroacetoacetate (VIII). It will be understood that other halogens, e.g., bromine, are also suitable.) The ethyl alpha-chloroacetoacetate (VIII) is treated with 2-mercaptoethanol (IV) in the presence of a base in a manner analogous to the first method described above, causing the formation of two intermediates IX and X, which need not be isolated. Instead the intermediates are cyclized and dehydrated by the action of acid as in the first method, conveniently by heating under reflux in a benzene solution thus removing the water azeotropically to give XI. This ester (XI) is then hydrolyzed to 2,3-dihydro-5-carboxy-6-methyl-1,4-oxathiin (XII) by boiling a short time with aqueous alkali. The acid XII is converted to the acid chloride XIII by means of thionyl chloride (or equivalent halogenating agent), and the amide I is then obtained from XIII by adding an amine. The acid chloride XIII will react with any primary or secondary amine (including hydrazine or ammonia) without limitation to form the amide I ($n=0$).

The first method which is the more direct method is more sensitive to side reactions and the yields of (I, $n=0$) obtained by such method may be lower. Equations representing the second method are as follows:

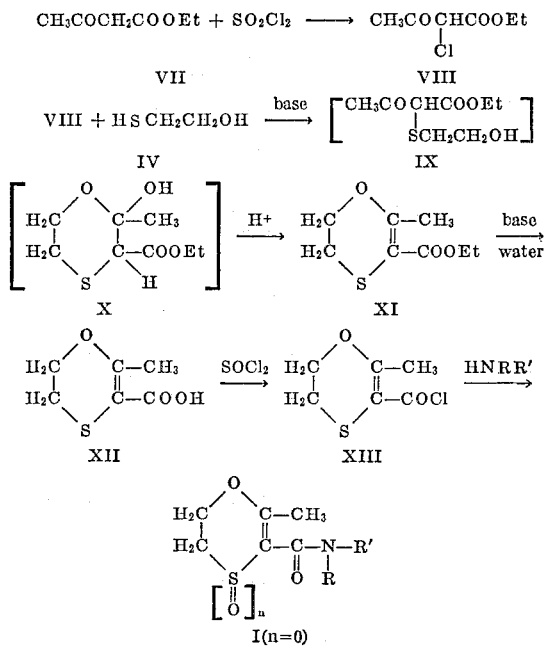

The following preparations will serve to illustrate ways of making the starting chemicals used in making the sulfoxides and sulfones of the invention.

PREPARATION A, BY METHOD 1

2,3 - dihydro - 5 - carboxanilido - 6 - methyl - 1,4-oxathiin (I, R'=C₆H₅, R=H, $n=0$) (from acetoacetanilide)

Step I: preparation of alpha-chloroacetoacetanilide (III, R'=C₆H₅, R=H).—To a stirred suspension of acetoacetanilide (150 g., 0.845 mole) and dry benzene (one liter) was added sulfuryl chloride (72 ml. or 120 g., 0.890 mole) dropwise over a period of 1½ hr. The stirring was continued for ½ hr. more. The product was filtered (the filtrate used in a second run in place of dry benzene gave a higher yield of alpha-chloroacetoacetanilide), washed with water and benzene and dried. Yield 131 g. (73.5%); M.P. 136–138° C. [Naik, Trivedi and Mankad, J. Indian Chem. Soc., 20, 365 (1943); Bulow and King, Ann. 439, 211 (1924)].

Step II: preparation of 2,3-dihydro-5-carboxanilido-6-methyl - 1,4 - oxathiin, using potassium hydroxide. (I, R'=C₆H₅, R=H, $n=0$).—To a stirred suspension of alphachloroacetoacetanilide (63.5 g. or 0.3 mole) and dry benzene (300 ml.) was added a solution of potassium hydroxide (20.4 g.), 2-mercaptoethanol (22.2 ml. or 23.7 g., 0.3 mole) and methanol (40 ml.) dropwise over a period of two hours, keeping the temperature below 30° C. The mixture was stirred for one hour more. The potassium chloride which precipitated was filtered. The solvents were removed from the filtrate by distillation. Benzene was added to the residue and then washed with water till neutral. The benzene solution was acidified with p-toluenesulfonic acid (0.8 g.) and heated under reflux using a Dean-Stark trap to collect water. The water collected was 5 ml. (theory 5.4 ml.). The solution was washed with water and the benzene removed. The residue solidified and was crystallized from 95% ethanol. Yield 45.8 g. (65%) M.P. 93–95° C.

Step II (alternate): using sodium bicarbonate in place of potassium hydroxide.—To a stirred suspension of alpha-chloroacetoacetanilide (42.3 g. or 0.2 mole) in benzene (200 ml.) and 2-mercaptoethanol (17 g.) was added a solution of sodium bicarbonate (22 g.) in water (150 ml.) portionwise in one hour. The reaction mixture was further stirred until all the solids went into solution (½ hour). The benzene layer was separated, washed with water, acidified with p-toluenesulfonic acid (0.5 g.) and then heated under reflux, removing the water (3.5 ml.) formed by azeotropic distillation using a Dean-Stark trap. The reaction mixture was cooled, washed with water and the solvent removed. The residue was crystallized from methanol. Yield 27 g.; M.P. 93–94° C.

The mother liquors were taken to dryness but the viscous oily residue would not crystallize. This was dissolved in benzene, washed with aqueous sodium hydroxide and with water and the benzene removed. The residue solidified quickly and crystallized from methanol. Yield 8.5 g.; M.P. 92–93° C.; total yield 35.5 g. (75%).

PREPARATION A, BY METHOD 2

[From ethyl acetoacetate (VII)]

Step I: preparation of ethyl alpha-chloroacetoacetate (VIII).—[Allihn, Ber., 11, 567 (1878). Boehme, W. R. Org. Syn., vol. 33, 43 (1953).] To a stirred and cooled solution of ethyl acetoacetate (260 g. or 2 moles) was added sulfuryl chloride (270 g. or 2 moles) over 3 hours, keeping the temperature between 0° and 5° C. The reaction mixture was left over night. The sulfur dioxide and hydrogen chloride were removed on a water pump. The residual dark liquid was distilled at reduced pressure. After a small forerun the liquid distilling between 88–90° C. (at 15 mm.) was collected. Yield 300 g. (91%).

Step II: preparation of ethyl 2,3-dihydro-6-methyl-1,4- oxathiin-5-carboxylate (XI).—To a cooled and stirred solution of ethyl alpha-chloroacetoacetate (33 g. or 0.2 mole) and dry benzene (200 ml.) was added a solution of potassium hydroxide (13.6 g.); 2-mercaptoethanol (15.0 ml. or 16 g.) and methanol (30 ml.) over a period of 1½ hour keeping the temperature below 30° C. The reaction mixture was stirred for ½ hour more. The potassium chloride formed was filtered. The solvents were removed from the filtrate. Benzene was added to the residue and then washed with water. The benzene solution was acidified with p-toluene-sulfonic acid and the water (3.4 ml.; theory 3.6 ml.) was collected by azeotropic distillation using the Dean-Stark trap. The reaction mixture was cooled, washed with water and then the benzene removed. The residue was distilled under high vacuum; B.P. (1 mm.) 107–110° C.; yield=23 g. (61.2%). This compound was also prepared using sodium bicarbonate as in Method 1 (alternate) instead of potassium hydroxide. The yield was 76%.

Step III: preparation of 2,3-dihydro-5-carboxy-6-methyl-1,4-oxathiin (XXII).—To a solution of ethyl 2,3-dihydro-6-methyl-1, 4-oxathiin-5-carboxylate (188 g.) in 95% ethanol (50 ml.) was added a solution of sodium hydroxide (60 g.) in water (400 ml.). The reaction mixture was heated under reflux until the two layers became homogeneous (about ½ hour).

The solution was cooled, diluted with water and acidified with dilute hydrochloric acid. The white solid which precipitated was filtered *at once,* washed with water and dried in air. Yield 134 g. (84%); M.P. 178–180° C. Recrystallized material from ethanol melted at 180–181° C.

Step IV: preparation of 2,3-dihydro-5-carboxanilido-6-methyl-1,4-oxathiin (I, R'=C$_6$H$_5$, R=H, n=0).—To a suspension of 2,3-dihydro-5-carboxy-6-methyl-1,4-oxathiin (XII) (32 g. or 0.2 mole) in chloroform (200 ml.) was added thionyl chloride (16 ml.) and the solution was heated under reflux. Hydrogen chloride and sulfur dioxide were evolved and all the solids went into solution in two hours. The excess thionyl chloride and solvent were removed in vacuo. To the residue (XIII) dissolved in chloroform (or benzene) was added a solution of aniline (37.2 g.) in chloroform (or benzene), portionwise. The aniline hydrochloride which formed was filtered. The filtrate was washed with very dilute hydrochloric acid solution and then with water. The chloroform (or benzene) was removed and the residue solidified at once. It was recrystallized from 95% ethanol. Yield 38 g. (80%); M.P. 93–94° C.

PREPARATION B

Another starting chemical useful in making the sulfoxides and sulfones of the invention is 2,3-dihdro-5-m-methylcarboxanilido-6-methyl-1,4-oxathiin. This may be prepared in the following manner: To 2,3-dihydro-5-carboxyl-6-methyl-1,4-oxathiin (480 g., 3 mole) (for details of preparation of this acid see above Preparation A, By Method 2, steps I, II and III) suspended in chloroform (600 ml.) was added thionyl chloride (393 g., 3.3 moles) and the reaction mixture was heated under gentle reflux until all the solid dissolved (1.5 hours). The solvent and excess thionyl chloride were distilled off under reduced pressure at a temperature below 50° C. at all times. The residual acid chloride was dissolved in chloroform (100 ml.) and the warm solution was added dropwise over about three quarters of an hour to a cooled and stirred solution of m-toluidine (660 g.) in chloroform (600 ml.). The temperature was kept at 20–30° C. The reaction mixture was stirred for fifteen minutes after the completion of the addition of the acid chloride, then washed with dilute hydrochloric acid, with water and with aqueous sodium bicarbonate. The solvent was removed by distillation under slightly reduced pressure an the residue was crystallized from isopropanol. The yield of almost white solid melting at 82–84° C. was 610 g. or 82%.

PREPARATION C

Another example of a starting chemical is 2,3-dihydro-5-(N-cyclohexyl-carboxamido)-6-methyl - 1,4 - oxathiin. This may be prepared in the following manner. To a suspension of 2,3-dihydro-5-carboxy-6-methyl-1,4-oxathiin (40 g. ¼ mole) see Preparation A, above) in chloroform (100 ml.) was added thionyl chloride (33 g.) and the reaction mixture was heated under gentle reflux until all the solid dissolved (about 1.5 hours). The solvent and excess thionyl chloride was distilled off under reduced pressure at a temperature below 50° C. The residual acid chloride was dissolved in chloroform (50 ml.) and the solution was added dropwise over about one half hour to a stirred solution of cyclohexylamine (60 g.) in chloroform (150 ml.). The temperature was kept at 20–30° C. by cooling. The reaction mixture was stirred for fifteen minutes longer and then washed with dilute hydrochloric acid and with aqueous sodium bicarbonate. The solvent was removed and the residue was crystallized from isopropanol yielding 52 g. or 86% of white solid melting at 130–131° C.

PREPARATION D

Another starting chemical is 2,3-dihydro-5-(3,5-dichlorocarboxanilido)-6-methyl-1,4-oxathiin. This may be prepared in the following manner. To a suspension of 2,3-dihydro-5-carboxy-6-methyl-1,4-oxathiin (32 g. 0.2 mole) in chloroform (100 ml.) was added thionyl chloride (26 g.) and the reaction mixture was heated under gentle reflux until the solid dissolved (about 1.5 hours). The solvent and excess thionyl chloride were distilled off under reduced pressure at a temperature below 50° C. The residual acid chloride was dissolved in benzene (50 ml.) and the solution added to a solution of 3,5-dichloroaniline (71 g.) in benzene (300 ml.). The resulting reaction mixture was allowed to stand overnight, then washed with dilute hydrochloric acid and with aqueous sodium bicarbonate. The benzene was distilled off and the residue crystallized from ethanol yielding two crops of a white solid melting at 147–149° C. and weighing 46 g. (76%).

PREPARATION E

Another starting chemical is 2,3-dihydro-5-(2-4,5trichlorocarboxanilido)-6-methyl-1,4-oxathiin. This may be prepared in the following manner. To a suspension of 2,3-dihydro-5-carboxy-6-methyl-1,4-oxathiin (32 g. 0.2 mole) in chloroform (100 ml.) was added thionyl chloride (26 g.) and the reaction mixture was heated under gentle reflux until all the solid dissolved (about 1.5 hours). The solvent and excess thionyl chloride were distilled off under reduced pressure at a temperature below 50° C. The residual acid chloride was dissolved in benzene (50 ml.) and then added to a solution of 2,4,5-trichloroaniline (85 g.) in benzene (300 ml). The resulting mixture was allowed to stand at room temperature overnight, then filtered. The benzene solution on washing with dilute hydrochloric acid and with aqueous sodium bicarbonate and on removal of the solvent yielded 13 g. of the amide. The benzene-insoluble material on extraction with chloroform washing with water and crystallization from ethanol-acetone yielded 34.5 g. more of the amide. The total yield of the amide was 47.5 g. (70%) melting at 165–167° C.

PREPARATION F

Another starting chemical is 2,3-dihydro-5-(N-n-octyl-carboxamido)-6-methyl-1,4-oxathiin. This may be prepared in the following manner. To a suspension of 2,3-dihydro-5-carboxy-6-methyl-1,4-oxathiin (40 g. ¼ mole) in chloroform (100 ml.) was added thionyl chloride (33 g.) and the reaction mixture was heated under gentle reflux until all the solid dissolved (about 1.5 hours). The solvent and thionyl chloride were removed under slightly reduced pressure at a temperature below 50° C. The residual acid chloride was dissolved in chloroform (60 ml.) and the solution was added dropwise over 15 minutes to a stirred solution of n-octylamine (33 g.), triethylamine (36 ml.) and chloroform (150 ml.) keeping the temperature at 20–30° C. The reaction mixture was stirred for 15 minutes longer and then washed with dilute hydrochloric acid and with aqueous sodium bicarbonate. The solvent was removed and the residue was crystallized from isopropanol yielding two crops of white solid melting at 74–75° C. and weighing 56.5 g. (84%).

In the above equations R and R' represent hydrogen, $NH_2$, or various univalent organic groups, whether a hydrocarbon group or an equivalent substituted hydrocarbon group. As specific new chemicals of the type I there may be mentioned by way of non-limiting example such compounds as 2,3-dihydro-5-carboxanilido-6-methyl-1,4-oxathiin-4-oxide,
2,3-dihydro-5-m-methylcarboxanilido-6-methyl-1,4-oxathiin-4-oxide,
2,3-dihydro-5-o-ethylcarboxanilido-6-methyl-1,4-oxathiin-4-oxide,
2,3-dihydro-5-p-methoxy-carboxanilido-6-methyl-1,4-oxathiin-4-oxide,
2,3-dihydro-5-p-chlorocarboxanilido-6-methyl-1,4-oxathiin-4-oxide,
2,3-dihydro-5-o-carbethoxycarboxanilido-6-methyl-1,4-oxathiin-4-oxide,
2,3-dihydro-5-(2,4-dichlorocarboxanilido)-6-methyl-1,4-oxathiin-4-oxide,
2,3-dihydro-5-(2,4-dimethylcarboxanilido)-6-methyl-1,4-oxathiin-4-oxide,
2,3-dihydro-5-(2,6-diethylcarboxanilido)-6-methyl-1,4-oxathin-4-oxide,
2,3-dihydro-5-(2-ethyl-4-methylcarboxanilido)-6-methyl-1,4-oxathiin-4-oxide,
2,3-dihydro-5-(2,4,6-trimethylcarboxanilido)-6-methyl-1,4-oxathiin-4-oxide,
2,3-dihydro-5-N-beta-naphthylcarboxamido-6-methyl-1,4-oxathiin-4-oxide,
2,3-dihydro-5-N-allylcarboxamido-6-methyl-1,4-oxathiin-4-oxide,
2,3-dihydro-5-N-isopropylcarboxamido-6-methyl-1,4-oxathiin-4-oxide,
2,3-dihydro-5-N-dodecylcarboxamido-6-methyl-1,4-oxathiin-4-oxide,
2,3-dihydro-5-N-hexadecylcarboxamido-6-methyl-1,4-oxathiin-4-oxide,
2,3-dihydro-5-N,N-dibutylcarboxamido-6-methyl-1,4-oxathiin-4-oxide,
2,3-dihydro-5-N-cyclohexylcarboxamido-6-methyl-1,4-oxathiin-4-oxide,
2,3-dihydro-5-N-alpha-furylcarboxamido-6-methyl-1,4-oxathiin-4-oxide,
2,3-dihydro-5-N-ethylcarboxanilido-6-methyl-1,4-oxathiin-4-oxide,
2,3-dihydro-5-carboxmorpholido-6-methyl-1,4-oxathiin-4-oxide,
2,3-dihydro-5-carboxanilido-6-methyl-1,4-oxathiin-4,4-dioxide,
2,3-dihydro-5-m-methyl-carboxanilido-6-methyl-1,4-oxathiin-4,4-dioxide,
2,3-dihydro-5-o-ethylcarboxanilido-6-methyl-1,4-oxathiin-4,4-dioxide,
2,3-dihydro-5-m-chlorocarboxanilido-6-methyl-1,4-oxathiin-4,4-dioxide,
2,3-dihydro-5-p-bromocarboxanilido-6-methyl-1,4-oxathiin-4,4-dioxide,
2,3-dihydro-5-o-methoxycarboxanilido-6-methyl-1,4-oxathiin-4,4-dioxide,
2,3-dihydro-5-p-carboxycarboxanilido-6-methyl-1,4-oxathiin-4,4-dioxide,
2,3-dihydro-5-o-phenylcarboxanilido-6-methyl-1,4-oxathiin-4,4-dioxide,
2,3-dihydro-5-(2,3-dimethylcarboxanilido)-6-methyl-1,4-oxathiin-4,4-dioxide,
2,3-dihydro-5-(2,4-dimethylcarboxanilido)-6-methyl-1,4-oxathiin-4,4-dioxide,
2,3-dihydro-5-(2,6-diethylcarboxanilido)-6-methyl-1,4-oxathiin-4,4-dioxide,
2,3-dihydro-5-(2,5-diisopropylcarboxanilido)-6-methyl-1,4-oxathiin-4,4-dioxide,
2,3-dihydro-5-(2,4-dichlorocarboxanilido)-6-methyl-1,4-oxathiin-4,4-dioxide,
2,3-dihydro-5-(2-methyl-6-chlorocarboxanilido)-6-methyl-1,-oxathiin-4,4-dioxide,
2,3-dihydro-5-(3,4-dimethoxycarboxanilido)-6-methyl-1,4-oxathiin-4,4-dioxide,
2,3-dihydro-5-(2,4,6-trimethylcarboxanilido)-6-methyl-1,4-oxathiin-4,4-dioxide,
2,3-dihydro-5-N-alpha-naphthylcarboxamido-6-methyl-1,4-oxathiin-4,4-dioxide,
2,3-dihydro-5-N-furylcarboxamido-6-methyl-1,4-oxathiin-4,4-dioxide,
2,3-dihydro-5-N-cyclohexylcarboxamido-6-methyl-1,4-oxathiin-4,4-dioxide,
2,3-dihydro-5-N-benzylcarboxamido-6-methyl-1,4- oxathiin-4,4-dioxide,
2,3-dihydro-5-N-pentylcarboxamido-6-methyl-1,4-oxathiin-4,4-dioxide,
2,3-dihydro-5-N-cyclopentylcarboxamido-6-methyl-1,4-oxathiin-4,4-dioxide,
2,3-dihydro-5-N-octylcarboxamido-6-methyl-1,4-oxathiin-4,4-dioxide,
2,3-dihydro-5-N-dodecylcarboxamido-6-methyl-1,4-oxathiin-4,4-dioxide,
2,3-dihydro-5-N-hexadecylcarboxamido-6-methyl-1,4-oxathiin-4,4-dioxide,
2,3-dihydro-5-N-furfurylcarboxamido-6-methyl-1,4,-oxathiin-4,4-dioxide,
2,3-dihydro-5-N,N-dibutylcarboxamido-6-methyl-1,4-oxathiin-4,4-dioxide,
2,3-dihydro-5-N-ethyl-N-methyl-carboxamido-6-methyl-1,4-oxathiin-4,4-dioxide,
2,3-dihydro-5-carboxmorpholido-6-methyl-1,4-oxathiin-4,4-dioxide,
2,3-dihydro-5-N-phenylethylcarboxamido-6-methyl-1,4-oxathiin-4,4-dioxide,
2,3-dihydro-5-N-carbethoxymethylcarboxamido-6-methyl-1,4-oxathin-4,4-dioxide,
2,3-dihydro-5-N-carboxymethylcarboxamido-6-methyl-1,4-oxathiin-4,4-dioxide,
and the like.

From the foregoing it will be apparent that R and R' may be any hydrocarbon group, whether straight chain, branched, or cyclic, whether saturated or unsaturated (aromatic unsaturation or non-benzenoid unsaturation) that is, aliphatic, cycloaliphatic and aromatic, including ethylenically unsaturated groups, among which may be mentioned such important groups, as alkyl (e.g., methyl, ethyl, hexyl, dodecyl, etc.), aryl (e.g., phenyl, naphthyl, biphenyl, etc.), aralkyl (e.g., benzyl, phenyl ethyl, etc.), alkaryl (e.g., tolyl, hexylphenyl, etc.), cycloalkyl (e.g., cyclopentyl, cyclohexyl, cyclooctyl, etc.), alkenyl (e.g., allyl, 2-buten-1-yl, methallyl, 1-octene-7-yl, etc.), and various combinations thereof. Equivalent to the hydrocarbon groups are the various substituted hydrocarbons, notably those substituted with halogens (e.g., chlorine, bromine), nitro, carboxyl, ether, ester, cyano, carboxamido, halogenalkyl, sulfo, sulfonamido hydroxyl, aryl, or similar groups, singly or as multi-substituents (e.g., R and/or R'=2.5-dichlorophenyl; 3,4-dichlorophenyl; 2-methyl-3,5 - dichlorophenyl; 2,4,6-trimethylphenyl; 2,4,6-trichlorophenyl), as will be exemplified in more detail below. Likewise the substitution may be in a carbon chain, for example in a ring to provide a heterocyclic ring, containing one or more of such hetero atoms as nitrogen, oxygen, and sulfur, as will be exemplified below. Thus, there may be mentioned such N-heterocyclic substituted products as those in which R and/or R' are pyridyl, benzothiazyl, triazolyl, furfuryl, furyl, quinolyl, beta-thienyl-ethyl, etc. Interesting forms of the invention may be provided by joining R and R' together to form a ring structure, e.g., a morpholido group,

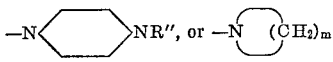

wherein R'' is alkyl (e.g., methyl, butyl, dodecyl, etc.) and $m$ is from 4 to 6. If desired R and/or R' may serve as linkages to another 2,3-dihydro-5-carboxamido-6-methyl-1,4-oxathiin sulfone or sulfoxide radical to form a bis compound. These embodiments are of course not exhaustive, and many other variations will be apparent to those skilled in the art.

Preferred chemicals of the invention are those in which R' is hydrogen or lower alkyl (including substituted alkyl, such as cyanoethyl) and R has one of the other values stated, particularly alkyl (especially hexyl), aryl (especially phenyl), alkaryl (especially tolyl, particularly o-tolyl and m-tolyl, 2,6-diethylphenyl, 2,4-dimethylphenyl), or cycloalkyl (especially cyclohexyl), or similar hydrocarbon group having up to 12 carbon atoms. Especially useful are the forms of the invention in which R is a phenyl group, in which category we include as equivalents substituted phenyl as represented by the formula

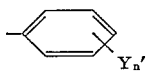

wherein Y is halogen (fluorine, chlorine, bromine, iodine), alkyl (e.g., methyl ethyl, hexyl, dodecyl), alkoxy (e.g., methoxy, ethoxy, dodecoxy), carboxamido, carboxyl, benzo (i.e., to provide a 1-naphthyl structure), phenyl or hydroxyl, and $n'$ is 0,1,2 or 3.

The following examples will serve to illustrate the practice of the invention in more detail.

Example 1.—2,3-dihydro-5-carboxanilido-6-methyl-1,4-oxathiin-4-oxide (I, R'=H, R=phenyl, $n$=1)

To a stirred solution of the chemical of Preparation A, above, namely, 2,3 - dihydro-5-carboxanilido - 6 - methyl-1,4 - oxathiin (25 g.), in acetic acid (150 ml.) and water (5 ml.) was added dropwise a solution of 30% hydrogen peroxide (12 ml.) and acetic acid (13 ml.) over 15 minutes. The temperature was maintained at 10–13° C. by cooling on ice. The solution was stirred at this temperature for 5 hours and then let stand at 10° C. overnight. The solvent was distilled off in vacuo, the last traces removed by alternate addition and removal of benzene in vacuo. The residue which solidified on cooling and scratching crystallized from isopropanol as white prisms melting at 120–121° C. The yield from two crops was 23.5 g. or 80%.

Example 2.—2,3 - dihydro - 5 - m - methylcarboxanilido-6 - methyl - 1,4 - oxathiin - 4 - oxide I, R'=H, R=m-tolyl, $n$=1)

To a stirred solution of the chemical of Preparation B, above, namely, 2,3 - dihydro-5-m-methylcarboxanilido - 6-methyl - 1,4 - oxathiin (18 g.) in acetone (100 ml.) was added dropwise 30% hydrogen peroxide (8.5 ml.) in acetone (20 ml.) over 15 minutes. The temperature was kept at 10–12° C. by cooling. The solution was stirred at 10–12° C. for 2 hours and then allowed to stand at 10° C. for 15 hours. The solvent was distilled off and the residual solid was crystallized from methanol yielding white prisms melting at 196–198° C. with decomposition. The yield was 15.5 g. or 80% from two crops.

Example 3.—2,3-dihydro-5-(N-cyclohexylcarboxamido)-6-methyl-1,4-oxathiin-4-oxide (I, R'=H, R=cyclohexyl, $n$=1)

To a stirred solution of the chemical of Preparation C, above, namely, 2,3 - dihydro - 5 - (N - cyclohexylcarboxamido) - 6 - methyl - 1,4 - oxathiin (36 g.) in acetic acid (200 ml.) was added dropwise a solution of 30% hydrogen peroxide (17 ml.) in acetic acid (18 ml.) over 15 minutes. The temperature was maintained at 10–12° C. by cooling. The reaction mixture was stirred at 10° C. for 3 hours, then let stand at 10° C. overnight. The solvent was removed in vacuo on the steam bath, the last traces by alternate addition and removal of benzene. The residue which solidified on cooling and scratching was crystallized from acetonitrile yielding white crystals melting at 140–141° C. the yield from two crops was 32 g. or 80%.

Example 4.—2,3 - dihydro - 5 - carboxanilido-6-methyl-1,4-oxathiin-4,4-dioxide (I, R'=H, R=phenyl, $m$=2)

(a) To a stirred solution of Preparation A, 2,3 - dihydro - 5 - carboxanilido - 6 - methyl-1,4-oxathiin (117.5 g., 0.5 mole), in acetic acid (500 ml.) was added 30% hydrogen peroxide (130 ml.) dropwise keeping the temperature of the reaction mixture at 45–50° C. by cooling on ice. After the exothermic reaction had subsided the reaction mixture was heated gently on the steam bath for one hour making sure that the temperature did not rise above 92° C. The reaction mixture was allowed to cool, diluted with 200 ml. of water and the white crystals which separated were filtered, washed, and dried, M.P. 126–128° C. The yield was 61 g. The filtrate on concentration yielded 60 grams more of the sulfone melting at 125–127° C. The total yield was 121 g. or 90%. Recrystallization from ethanol raised the melting point to 128–130° C.

(b) Alternate method using less solvent

A mixture of 2,3 - dihydro - 5 - carboxanilido-6-methyl - 1,4 - oxathiin (235 g., 1 mole) and glacial acetic acid (90 ml.) was heated to form a slurry and then cooled to 70° C. To this stirred slurry was added dropwise 30% hydrogen peroxide (250 ml.) over a period of one hour. The reaction mixture which soon became a solution was kept at a temperature of 70–75° C. by cooling during the addition of the first half of the peroxide and by warming during the addition of the second half of the peroxide. Then the light-colored solution was stirred and heated at 70–75° C. for 5 hours and finally at 90–95° C. for one hour. On cooling the sulfone crystallized out from the solution as white prisms melting at 127–128° C. The yield was 223 g. or 84%.

Example 5.—2,3 - dihydro - 5 - (3,5 - dichlorocarboxanilido) - 6 - methyl - 1,4 - oxathiin - 4,4 - dioxide (I, R'=H, R=3,5-dichlorophenyl, $n$=2)

To a stirred solution of Preparation D, above, namely 2,3 - dihydro - 5 - (3,5 - dichlorocarboxanilido)-6-methyl - 1,4 - oxathiin (20 g.) in acetic acid (275 ml.) and acetone (50 ml.) was added dropwise 30% hydrogen peroxide (20 ml.) keeping the temperature at 45–50° C. The resulting solution was heated at 40–60° C. for two hours and then poured into water. The precipitate was crystallized from ethanol, M.P. 213–214° C. with decomposition. The yield was 13 g. or 59%.

Example 6.—2,3 - dihydro - 5 - (2,4,5 - trichlorocarboxanilido) - 6 - methyl - 1,4 - oxathiin - 4,4 - dioxide (I, R'=H, R=2,4,5-trichlorophenyl, $n$=2)

To a stirred solution of Preparation E, above, namely, 2,3 - dihydro - 5 - (2,4,5 - trichlorocarboxanilido) - 6-methyl - 1,4 - oxathiin (24 g.) in acetic acid (350 ml.) and acetone (360 ml.) was added dropwise 30% hydrogen peroxide (21 ml.) keeping the temperature at 70° C.

The reaction mixture was heated at 70° C. for two hours and then diluted with water. The precipitate was filtered, washed with water, dried, and crystallized from ethanol-acetone. The white crystals melted at 210–211° C. with decomposition and weighed 18 g. (69%).

Example 7.—2,3 - dihydro - 5 - (N - n - octylcarboxamido) - 6 - methyl - 1,4 - oxathiin - 4,4 - dioxide (I, R'=H, R=n-octyl, n=2)

To a stirred solution of 2,3 - dihydro - 5 - (N - n - octylcarboxamido) - 6 - methyl - 1,4 - oxathiin (20 g.) in acetic acid (100 ml.) was added dropwise 30% hydrogen peroxide (24 ml.) keeping the temperature at 45–50° C. by cooling. After the exothermic reaction subsided the solution was heated on the steam bath occasionally for one hour keeping the temperature at 85–92° C. and then poured into water. The precipitate was filtered, washed with water and dried. The aqueous acetic acid solution on concentration yielded more of the sulfone. Crystallization from ethanol gave white prisms melting at 140° C. The yield was 19 g. or 80%.

The following tables summarize the foregoing and other examples.

TABLE I.—2,3-DIHYDRO-5-CARBOXAMIDO-6-METHYL-1,4-OXATHIIN-4-OXIDES

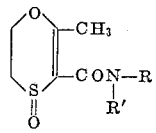

| Ex. | Name of the 5-substituent | Parent amine | R | M.P., °C. | Yield, percent |
|---|---|---|---|---|---|
| 1 | Carboxanilido | Aniline | $C_6H_5$ | 121–122 | 80 |
| 2 | m-Methylcarboxanilido | m-Toluidine | $m\text{-}CH_3\text{-}C_6H_4-$ | 196–198d | 85 |
| 8 | o-Methylcarboxanilido | o-Toluidine | $o\text{-}CH_3\text{-}C_6H_4-$ | 121–123 | 88 |
| 9 | p-Methylcarboxanilido | p-Toluidine | $p\text{-}CH_3\text{-}C_6H_4-$ | 149–150 | 83 |
| 10 | o-Ethylcarboxanilido | o-Ethylaniline | $o\text{-}C_2H_5C_6H_4$ | 106–107 | 80 |
| 11 | m-Methoxycarboxanilido | m-Methoxyaniline | $m\text{-}CH_3OC_6H_4-$ | 155–157 | 82 |
| 12 | o-Chlorocarboxanilido | o-Chloroaniline | $o\text{-}ClC_6H_4-$ | 143–144 | 82 |
| 13 | p-Carboxycarboxanilido | p-Carboxyaniline | $p\text{-}HOOCC_6H_4-$ | 230–235d | 84 |
| 14 | 2,3-dimethylcarboxanilido | 2,3-dimethylaniline | $2,3\text{-}(CH_3)_2C_6H_3-$ | 136–137 | 85 |
| 15 | 2,4-dimethylcarboxanilido | 2,4-dimethylaniline | $2,4\text{-}(CH_3)_2C_6H_3-$ | 121–122 | 72 |
| 16 | 2,3-dichlorocarboxanilido | 2,3-dichloroaniline | $2,3\text{-}Cl_2C_6H_3-$ | 177–178d | 99 |
| 17 | 3,4-dimethoxycarboxanilido | 3,4-dimethoxyaniline | $3,4\text{-}(CH_3O)_2\text{-}C_6H_3$ | 188–190d | 75 |
| 18 | N-methylcarboxanilido | N-methylaniline | $C_6H_5 R'=CH_3$ | 168–170d | 83 |
| 19 | N-ethylcarboxanilido | N-ethylaniline | $C_6H_5 R'=C_2H_5$ | 112–113 | 50 |
| 20 | N-isopropylcarboxamido | Isopropylamine | $-CH(CH_3)_2$ | 121–122 | 74 |
| 21 | N-n-butylcarboxamido | n-Butylamine | $-C_4H_9\text{-}n$ | Wax | |
| 22 | N-t-butylcarboxamido | t-Butylamine | $-C(CH_3)_3$ | 153–154 | 79 |
| 23 | N-dodecylcarboxamido | n-Dodecylamine | $-C_{12}H_{25}\text{-}n$ | 79–81 | 75 |
| 24 | N-octadecylcarboxamido | n-Octadecylamine | $-C_{18}H_{37}\text{-}n$ | 86–88 | 67 |
| 3 | N-cyclohexylcarboxamido | Cyclohexylamine | $-C_6H_{11}$ | 140–141 | 80 |
| 25 | Carboxmorpholido | Morpholine | (together with R') morpholino | 104–106 | 65 |

TABLE II.—2,3-DIHYDRO-5-CARBOXAMIDO-6-METHYL-1,4-OXATHIIN-4,4-DIOXIDES

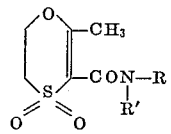

| Ex. | Name of the 5-substituent | Parent amine | R | M.P., °C. | Yield, percent |
|---|---|---|---|---|---|
| 4 | Carboxanilido | Aniline | $C_6H_5$ | 125–126 | 90 |
| 26 | m-Methylcarboxanilido | m-Toluidine | $m\text{-}CH_3C_6H_4-$ | 133–135 | 90 |
| 27 | o-Methylcarboxanilido | o-Toluidine | $o\text{-}CH_3C_6H_4-$ | 123–125 | 85 |
| 28 | p-Methylcarboxanilido | p-Toluidine | $p\text{-}CH_3C_6H_4-$ | 163–165 | 87 |
| 29 | o-Ethylcarboxanilido | o-Ethylaniline | $o\text{-}C_2H_5C_6H_4-$ | 106 | 64 |
| 30 | m-Bromocarboxanilido | m-Bromoaniline | $m\text{-}BrC_6H_4-$ | 138–140 | 80 |
| 31 | p-Bromocarboxanilido | p-Bromoaniline | $p\text{-}BrC_6H_4-$ | 215 | 95 |
| 32 | m-Chlorocarboxanilido | m-Chloroaniline | $m\text{-}ClC_6H_4-$ | 180–183°d | 68 |
| 33 | o-Chlorocarboxanilido | o-Chloroaniline | $o\text{-}ClC_6H_4-$ | 173–174 | 91 |
| 34 | p-Chlorocarboxanilido | p-Chloroaniline | $p\text{-}ClC_6H_4-$ | 217–219 | 95 |
| 35 | m-Methoxycarboxanilido | m-Methoxyaniline | $m\text{-}CH_3OC_6H_4-$ | 150–152 | 86 |
| 36 | o-Methoxycarboxanilido | o-Methoxyaniline | $o\text{-}CH_3OC_6H_4-$ | 186 | 70 |
| 37 | p-Methoxycarboxanilido | p-Methoxyaniline | $p\text{-}CH_3OC_6H_4-$ | 137–138 | 90 |
| 38 | o-Carboxycarboxanilido | Anthranilic acid | $o\text{-}HOOCC_6H_4$ | 243–244 | 82 |
| 39 | o-Carboxamidocarboxanilido | o-Carboxamidoaniline | $o\text{-}H_2NCO\text{-}C_6H_4-$ | 207–208d | 34 |
| 40 | p-Carbethoxycarboxanilido | p-Carbethoxyaniline | $p\text{-}C_2H_5OCOC_6H_4-$ | 156–162 | 50 |
| 41 | m-Nitrocarboxanilido | m-Nitroaniline | $m\text{-}NO_2C_6H_4-$ | 191–193 | 96 |
| 42 | p-Phenylcarboxanilido | p-Phenylaniline | $p\text{-}C_6H_5C_6H_4-$ | 217–220d | 60 |
| 43 | 2,3-dimethylcarboxanilido | 2,3-dimethylaniline | $2,3\text{-}(CH_3)_2C_6H_3-$ | 151–153 | 44 |
| 44 | 2,4-dimethylcarboxanilido | 2,4-dimethylaniline | $2,4\text{-}(CH_3)_2C_6H_3-$ | 144–146 | 75 |
| 45 | 2,5-dimethylcarboxanilido | 2,5-dimethylaniline | $2,5\text{-}(CH_3)_2C_6H_3-$ | 130–133 | 83 |
| 46 | 3,4-dimethylcarboxanilido | 3,4-dimethylaniline | $3,4\text{-}(CH_3)_2C_6H_3-$ | 163–165 | 95 |
| 47 | 2-methyl-3-chlorocarboxanilido | 2-methyl-3-chloroaniline | $2\text{-}CH_3\text{-}3\text{-}Cl\text{-}C_6H_3-$ | 152–154 | 78 |
| 48 | 2-methyl-4-chlorocarboxanilido | 2-methyl-4-chloroaniline | $2\text{-}CH_3\text{-}4\text{-}Cl\text{-}C_6H_3$ | 169–170 | 93 |
| 49 | 2-methyl-6-chlorocarboxanilido | 2-methyl-6-chloroaniline | $2\text{-}CH_3\text{-}6\text{-}Cl\text{-}C_6H_3-$ | 163–165 | 50 |
| 50 | 2-methyl-4-methoxycarboxanilido | 2-methyl-4-methoxyaniline | $2\text{-}CH_3\text{-}4\text{-}CH_3O\text{-}C_6H_3-$ | 133–136 | 60 |
| 51 | 2,3-dichlorocarboxanilido | 2,3-dichloroaniline | $2,3\text{-}Cl_2C_6H_3-$ | 159–161d | 65 |
| 52 | 2,5-dichlorocarboxanilido | 2,5-dichloroaniline | $2,5\text{-}Cl_2C_6H_3-$ | 178–179d | 68 |
| 53 | 3,4-dichlorocarboxanilido | 3,4-dichloroaniline | $3,4\text{-}Cl_2C_6H_3-$ | 160–162 | 48 |
| 5 | 3,5-dichlorocarboxanilido | 3,5-dichloroaniline | $3,5\text{-}Cl_2C_6H_3-$ | 213–214d | 59 |
| 6 | 2,4,5-trichlorocarboxanilido | 2,4,5-trichloroaniline | $2,4,5\text{-}Cl_3C_6H_2-$ | 210–211d | 69 |
| 54 | 2,5-dimethoxy-4-chlorocarboxanilido | 2,5-dimethoxy-4-chloroaniline | $2,5\text{-}(CH_3O)_2\text{-}4\text{-}ClC_6H_2-$ | 202–204 | 88 |
| 55 | N-methylcarboxanilido | N-methylaniline | $C_6H_5\text{-}R'=CH_3$ | 126 | 92 |
| 56 | N-ethylcarboxanilido | N-ethylaniline | $C_6H_5\text{-}R'=C_2H_5$ | 125–126' | 83 |
| 57 | N-beta-cyanoethyl-carboxanilido | N-beta-cyanoethylaniline | $C_6H_5\text{-}R'=CNCH_2CH_2-$ | 122–123 | 75 |
| 58 | N-benzylcarboxamido | Benzylamine | $C_6H_5CH_2-$ | 152–153 | 89 |
| 59 | N-isopropylcarboxamido | Isopropylamine | $(CH_3)_2CH-$ | 149–151 | 74 |

TABLE II.—2,3-DIHYDRO-5-CARBOXAMIDO-6-METHYL-1,4-OXATHIIN-4,4-DIOXIDES—Continued

| Ex. | Name of the 5-substituent | Parent amine | R | M.P., °C. | Yield, percent |
|---|---|---|---|---|---|
| 60 | N-n-butylcarboxamido | n-Butylamine | n-C$_4$H$_9$— | 156–157 | 75 |
| 61 | N-t-butylcarboxamido | t-Butylamine | (CH$_3$)$_3$C— | Liquid | |
| 62 | N-n-pentylcarboxamido | n-Pentylamine | C$_5$H$_{11}$— | 154–156 | 90 |
| 63 | N-n-hexylcarboxamido | n-Hexylamine | C$_6$H$_{13}$— | 150 | 85 |
| 64 | N-n-octylcarboxamido | n-Octylamine | C$_8$H$_{17}$— | 140 | 80 |
| 65 | N-n-decylcarboxamido | n-Decylamine | C$_{10}$H$_{21}$— | 118 | 69 |
| 66 | N-n-dodecylcarboxamido | n-Dodecylamine | C$_{12}$H$_{25}$— | 131–132 | 75 |
| 67 | N-n-octadecylcarboxamido | n-Octadecylamine | C$_{18}$H$_{37}$— | 122–123 | 80 |
| 68 | N-beta-chloroethylcarboxamido | Ethyleneamine | ClCH$_2$CH$_2$— | 181–182 | 20 |
| 69 | N-furfurylcarboxamido | Furfurylamine | C$_4$H$_3$OCH$_2$— | | 60 |
| 70 | N,N-diethylcarboxamido | Diethylamine | C$_2$H$_5$ R'=C$_2$H$_5$ | | 90 |
| 71 | N,N-dibutylcarboxamido | Dibutylamine | n-C$_4$H$_9$-R'=n-C$_4$H$_9$— | | 75 |
| 72 | Carboxmorpholido | Morpholine | R and R' together | 226–227d | 96 |

| 73 | N-cyclohexylcarboxamido | Cyclohexylamine | C$_6$H$_{11}$— | 182–184 | 80 |
| 74 | p-Sulfonamidocarboxanilido | Sulfanilamide | p-H$_2$NSO$_2$C$_6$H$_4$— | 238–239d | 36 |
| 75 | 2-methyl-5-chlorocarboxanilido | 2-methyl-5-chloroaniline | 2-CH$_3$-5-Cl-C$_6$H$_3$— | 156–158 | 95 |
| 76 | 3-chloro-4-methylcarboxanilido | 3-chloro-4-methylaniline | 3-Cl-4-CH$_3$-C$_6$H$_3$— | 159–160 | 84 |
| 77 | 2-methoxy-5-chlorocarboxanilido | 2-methoxy-5-chloroaniline | 2-CH$_3$O-5-Cl-C$_6$H$_3$— | 153–155 | 89 |
| 78 | N-ethyl-o-methylcarboxanilido | N-ethyl-o-methylaniline | o-CH$_3$C$_6$H$_4$-R'=C$_2$H$_5$ | 141–145 | 84 |
| 79 | 3,4-dimethoxycarboxanilido | 3,4-dimethoxyaniline | 3,4-(CH$_3$O)$_2$-C$_6$H$_3$— | 183–185 | 82 |
| 80 | N-hexadecylcarboxamido | n-Hexadecylamine | C$_{16}$H$_{33}$— | 125–126 | 83 |
| 81 | N-alpha-naphthylcarboxamido | Alpha-naphthylamine | C$_{10}$H$_7$— | 203–206 | 80 |
| 82 | 2-nitro-4-methylcarboxanilido | 2-nitro-4-methylaniline | 2-NO$_2$-4-CH$_3$-C$_6$H$_3$ | 150–152 | 52 |
| 83 | p-Benzeneazocarboxanilido | p-Aminoazobenzene | C$_6$H$_5$N=NC$_6$H$_4$— | 166–168 | 65 |
| 84 | p-Benzeneazoxy-carboxanilido | p-Aminoazoxybenzene | C$_6$H$_5$NONC$_6$H$_4$— | 185–187 | 82 |
| 85 | 2,4,6-trimethylcarboxanilido | 2,4,6-trimethylaniline | 2,4,6-(CH$_3$)$_3$-C$_6$H$_2$— | 158–160 | 82 |

Having thus described our invention, what we claim and desire to protect by Letters Patent is:

1. A chemical of the formula:

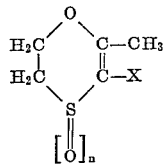

wherein [X is a carboxamido group and] $n$ is a number from 1 to 2 and X is a group of the formula:

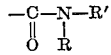

wherein R has up to 12 carbon atoms and is selected from the group consisting of alkyl, aryl, aralkyl, alkaryl, cycloalkyl and alkenyl, R' is hydrogen or lower alkyl, and R and R' may be joined together to form with the N a morpholido group.

2. A chemical as in claim 1 in which $n$ is 1.
3. A chemical as in claim 1 in which $n$ is 2.
4. A chemical as in claim 1 in which R is alkyl.
5. A chemical as in claim 1 in which R is alkyl-phenyl.
6. A chemical as in claim 1 in which R is chlorophenyl.
7. A chemical as in claim 1 in which R' is hydrogen, R is phenyl, and $n$ is 2.
8. A chemical as in claim 1 in which R is cyclohexyl.
9. A chemical as in claim 1 wherein R is phenyl substituted with one of the following:
   (a) 1 to 3 chlorine atoms
   (b) 1 to 3 alkyl groups
   (c) an alkoxy group
   (d) a carboxamido group
   (e) a carboxyl group
   (f) a benzo group
   (g) a phenyl group
   (h) an hydroxyl group.
10. A chemical as in claim 1 in which R is phenyl.

No references cited.

JAMES A. PATTEN, *Primary Examiner.*

UNITED STATES PATENT OFFICE
CERTIFICATE OF CORRECTION

Patent No. 3,399,214            August 27, 1968

Marshall Kulka et al.

It is certified that error appears in the above identified patent and that said Letters Patent are hereby corrected as shown below:

Column 13, line 36, cancel "[X is a carboxamido group and]"

Signed and sealed this 10th day of February 1970.

(SEAL)
Attest:

Edward M. Fletcher, Jr.            WILLIAM E. SCHUYLER, JR.
Attesting Officer            Commissioner of Patents